Figure 1:
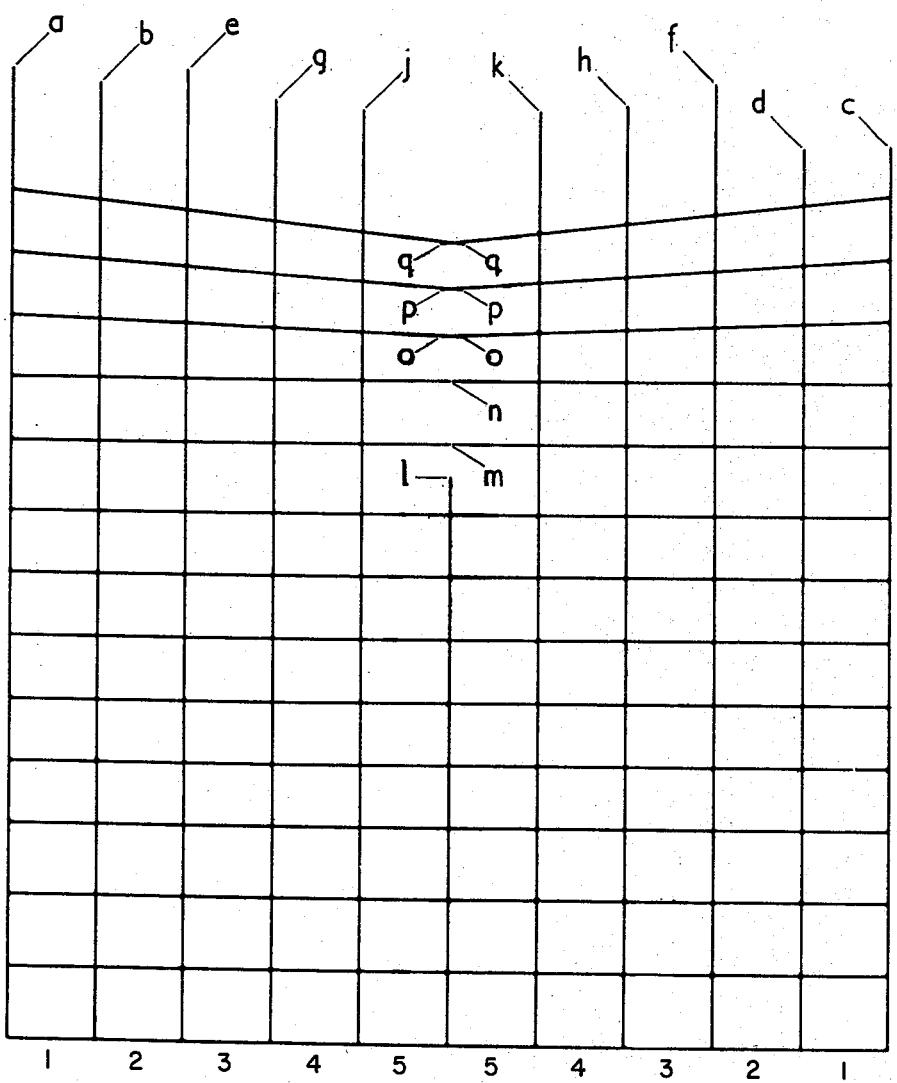

Jan. 7, 1964 S. A. JACKSON 3,116,858
METHODS OF MAKING DRESSMAKING FORMS OR DUMMIES
Filed Aug. 10, 1961 5 Sheets-Sheet 1

INVENTOR
STEPHEN A. JACKSON
By Irwin S. Thompson
ATTY.

INVENTOR
Stephen Arthur Jackson

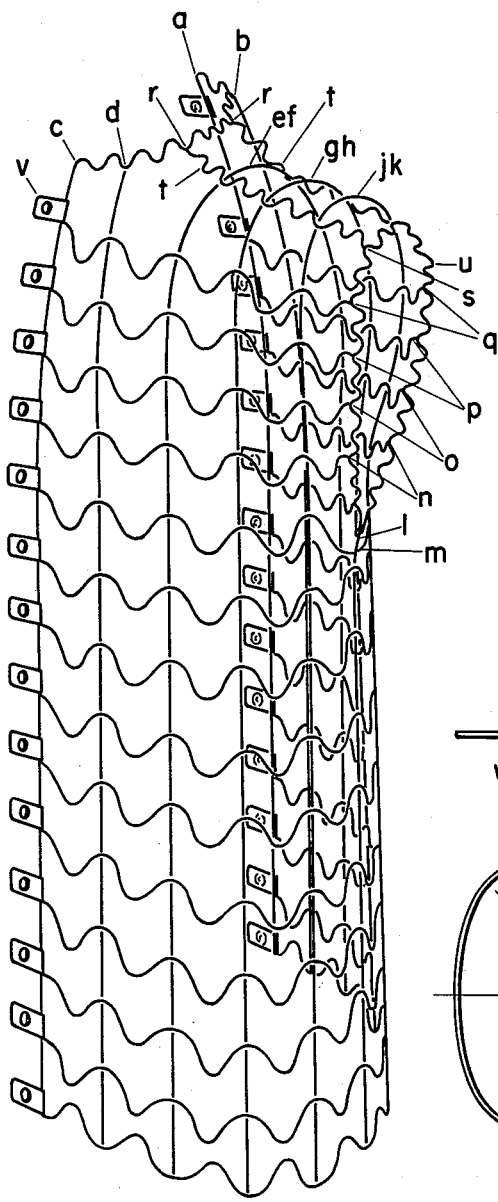
FIG. 7
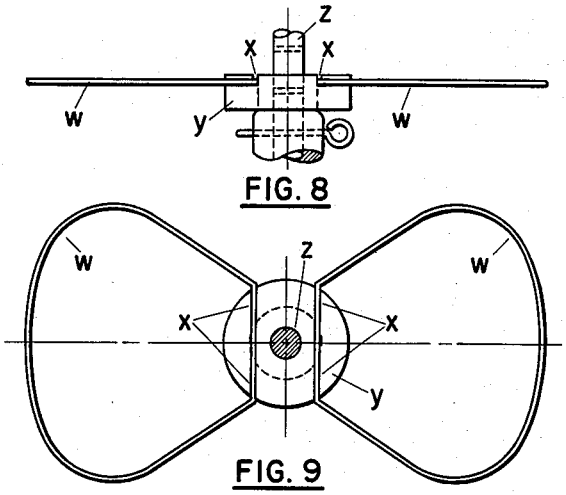
FIG. 8
FIG. 9
Stephen Arthur Jackson
INVENTOR

United States Patent Office 3,116,858
Patented Jan. 7, 1964

3,116,858
METHODS OF MAKING DRESSMAKING
FORMS OR DUMMIES
Stephen Arthur Jackson, 610 New North Road,
Auckland, New Zealand
Filed Aug. 10, 1961, Ser. No. 130,695
Claims priority, application New Zealand Sept. 16, 1960
6 Claims. (Cl. 223—68)

This invention relates to improvements in and methods for making dressmaking forms or dummies.

It is known to construct a dressmaking form or model or dummy (hereinafter referred to as a "dummy") of flexible but firm wire in the shape of a hollow somewhat tubular member divided longitudinally into two hales that may be temporarily clipped together front and back to surround the body of the subject for and of whom a dummy is to be made. This dummy covers the body of the subject from the neck to the hips and has arm holes therein.

The flexible wires of the dummy are manipulated after the dummy has been fastened around the subject so that the dummy finally covers neatly and closely the contour of the body of the subject from the neck over the bust and down into the waist and then out over the hips. The neck opening and the arm hole openings are also manipulated to the desired position and to the desired size.

The halves of the dummy are now separated and slid off the subject and being of a semi rigid nature they retain their shape. They are reassembled and mounted on a pedestal with arms extending out therefrom to support the shaped dummy at various points in its length. Thus a temporary or permanent dummy is obtained of the exact shape of a subject and she or a dressmaker has a model upon which a frock or dress may be built to the correct shape of the subject.

In one known type of this dummy it is made with many spaced straight vertical but flexible wires joined at intervals by looped horizontal wires and by separating these vertical wires by opening or closing the loops to a greater or lesser degree and bending the vertical wires to outline the figure of the subject desired close following of that figure is obtained. This type of dummy gives good results but it has to be built up upon a preformed model, of a number of longitudinal wires which start at the bottom front and going over the shoulder, end at the bottom at back and a number of lateral wires clipped together at each intersection of the vertical and horizontal lines.

The object of the present invention is to provide for the manufacture of a dummy of the type described which will be much simpler in construction and less costly to make than hitherto.

The invention comprises broadly the construction of a dummy of the type described by means of two flat panels each to form half of the dummy and each made of two series of straight lengths of flexible wires laid flat and crossing each other at intervals in a predetermined manner, these wires being welded, fused or otherwise connected as by an adhesive at their many junctions. Those lengths of lateral wires at the top of each panel are inclined downwardly towards the centre, and are also cut at the centre, thus forming the only successful design to give the required results. The lateral lengths of each panel are then corrugated to draw the longitudinal wires closer to each other. The cut ends in the centre are to be connected to a preformed wire section so designed to form an arm hole. Each of the two panels is then bent laterally to form a U shape and the top portions of each are bent in and are joined to each other for a short distance to form a shoulder cover, the remainder being left open to form half a neck encircling portion. The two panels are adapted to be detachably clipped together to form the completed dummy capable of encircling the figure of the subject to be patterned and of following the contours of that figure when the wires of the panels are suitably manipulated.

Figure 2:
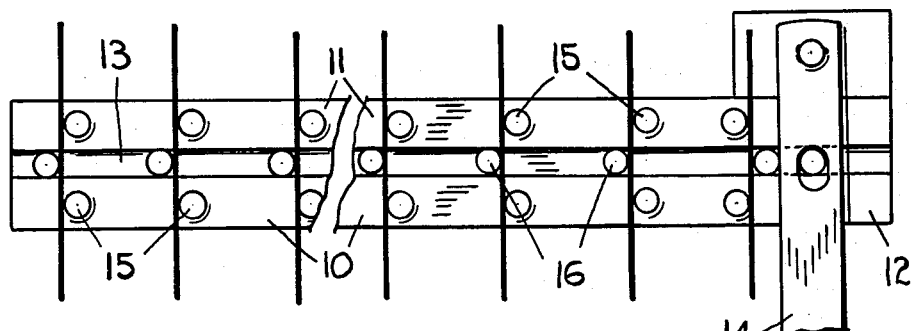
Figure 3:
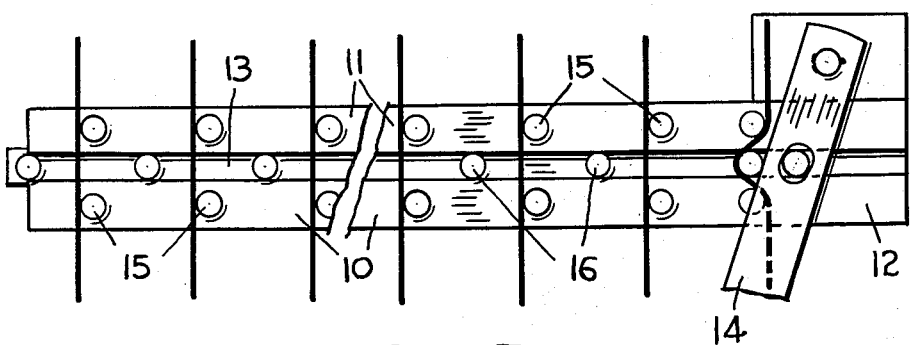
Figure 4:
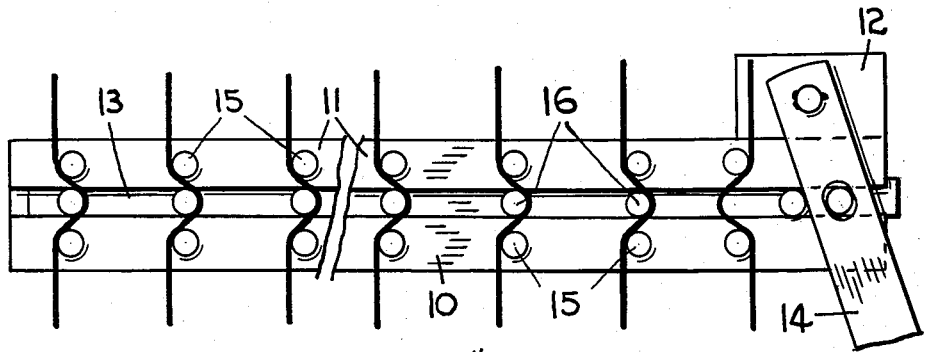
Figure 5:
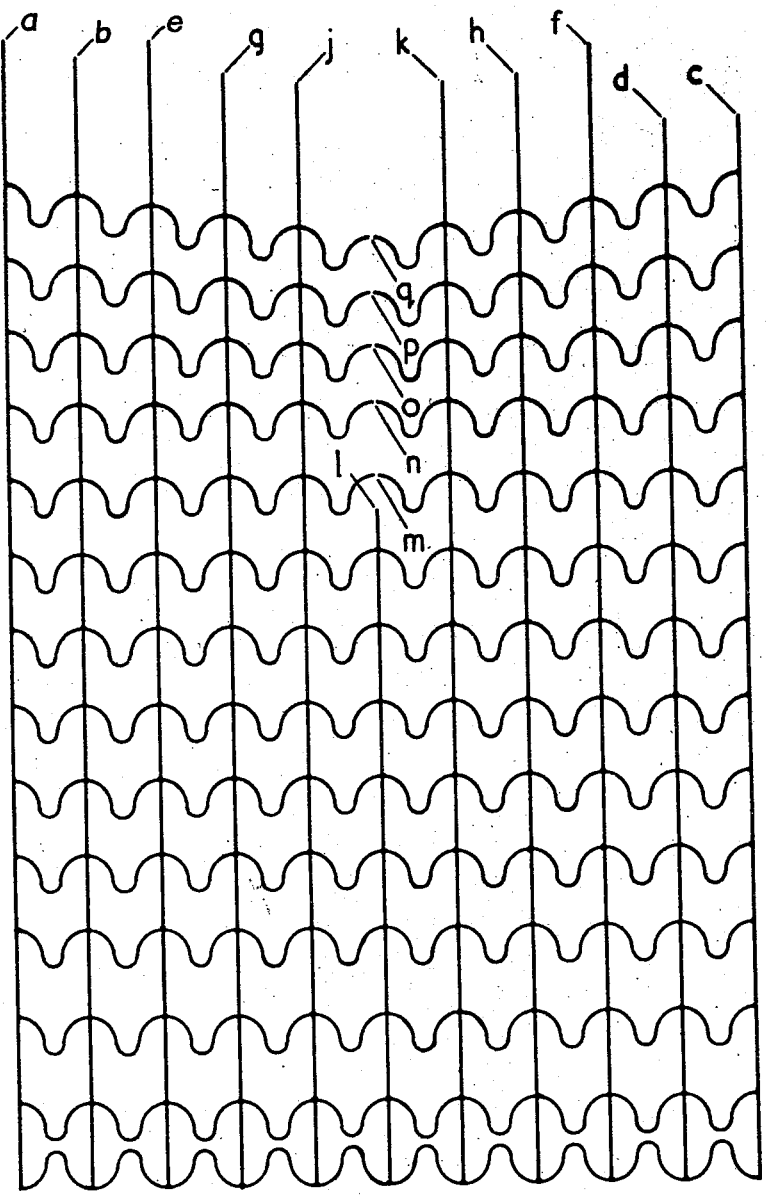
Figure 6:
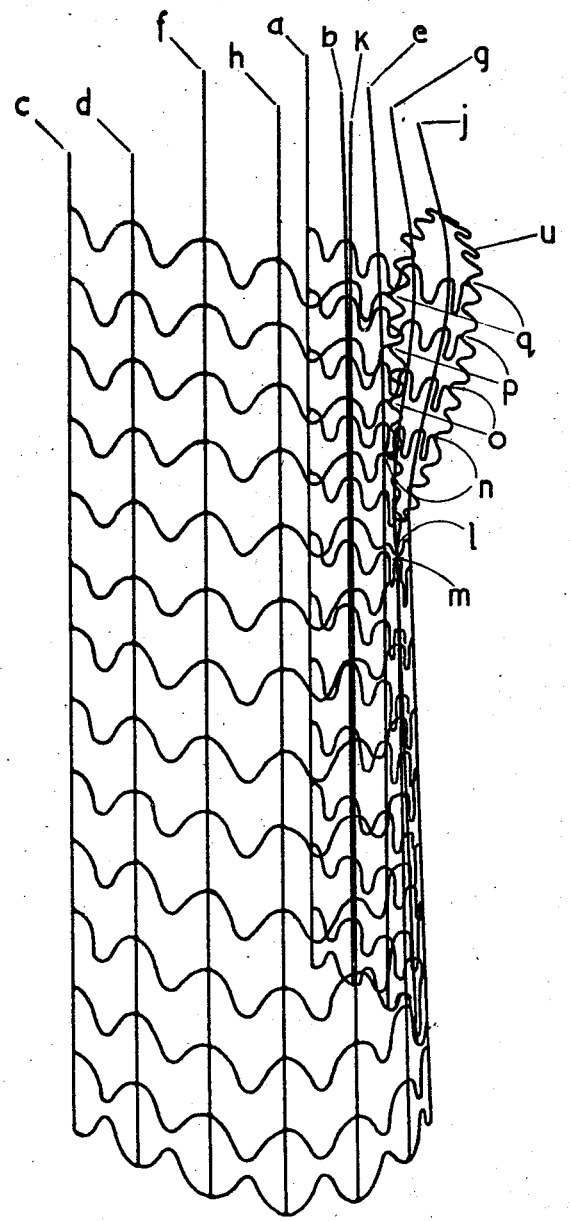

In further describing the invention reference will be made hereinafter to the accompanying drawings, in which:

FIGURE 1 is a plan view showing the lateral and longitudinal laid-out wires as a panel, FIGURE 2 is a plan view of a machine broken in its length having studs positioned adjacent certain lateral wires of the panel, FIGURE 3 is a similar view to FIGURE 2, but with a hand lever of the machine moved in one direction to corrugate a bottom lateral wire of the panel, FIGURE 4 is a similar view to FIGURE 2, but with the hand lever moved in a reverse direction to corrugate other lateral wires of the panel, FIGURE 5 is a plan view showing the lateral wires of the panel corrugated, FIGURE 6 is a perspective view showing the panel bent laterally and the preformed wire section or member attached, FIGURE 7 is a perspective view showing the bent panel and wire sections and parts of detachable fasteners attached, FIGURE 8 is a detail elevation and FIGURE 9 is a plan view of preformed hip shapes attached to a fixture mounting.

In giving effect to the invention, each of the two panels of the dummy is made of a series of lengths of wire which may be precovered but are preferably subsequently covered with plastic. This wire is of such a flexible nature that while it will readily lend itself to being bent when pulled or manipulated by the fingers of the operator, it will retain that shape and not collapse when unsupported.

For a panel, the wires are laid flat on a table and are arranged so that they extend laterally and longitudinally to form a shape having straight sides and bottom but uneven top edge as shown in FIGURE 1. The bottom lateral wires are intended to form the bottom of the dummy, the two outside longitudinal wires are intended to form the sides of the dummy. A few of the lateral wires at the top of the panel are inclined slightly downwardly as well as laterally from the outside edges of the panel to the centre in a predetermined pattern and are cut at the centres providing points $m$, $n$, $o$, $p$ and $q$, to form an opening which will subsequently form the armhole of the dummy. The centre longitudinal wire is cut providing a point $l$ at a predetermined height which will subsequently form the bottom point of the armhole of the dummy. The wires at their points of intersection are fastened to each other as by adhesive, fusing or welding.

The lateral wires of each panel are now corrugated in lines throughout the length of the panel, transforming it into the condition shown in FIGURE 5.

In order to corrugate the lateral wires of each panel, a machine is placed in each of the rows of the spaces 1 to 5 between two lateral wires. Referring to FIGURES 2 to 4, each such machine comprises two studded parallel side bars 10, 11 spaced a short distance apart and fixed to an end plate 12, a studded central bar 13 slidably mounted between the side bars and a hand lever 14 pivoted to the end plate 12 and articulated to the central bar 13. The length of the bars and the placing of studs 15, 16 of the side bars and the central bar, respectively, vary for the particular row of spaces. Each machine is placed with three of its studs touching a lateral wire as shown in FIGURE 2. The hand lever 14 of each machine is turned in one direction corrugating the bottom lateral wire as shown in FIGURE 3, and then each hand lever is turned in the other direction corrugating the other lateral wires as shown in FIGURE 4. This corrugates the lateral wires of one side of the panel. Each machine is now transferred to the similar numbered row of spaces in the other side of the panel and on similar operation of the machines, the other half of the lateral wires is corrugated.

The preformed flexible wire section or member u (FIGURE 6) is now attached to the cut ends in the centre of the top lateral wires at points m, n, o, p and q and also to the cut end of the longitudinal wire in the centre point l, the points l, m, n, o, p and q being fastened by welding.

The panel is now lifted and bent laterally to form a U, the armhole being suitably expanded, as shown in FIGURE 6.

The top ends of the wires e, f, g, h, j and k are now turned inwards in an arc to meet each other, point j being welded to point k, point g being welded to point h, and e being welded to point f as indicated in the four points j–k, g–h and e–f (see FIGURE 7).

Two short preformed extensible wire sections are now fastened laterally to the longitudinal wires and also to the preformed wire section which has formed the armhole (see FIGURE 7, points t. This figure also includes point s showing where the wire section t is welded in position to form the shoulder of the dummy.

The neck of the dummy is now formed by means of a preformed extensible wire section which is attached by welding to the ends of the longitudinal wires at points a, b, c and d and also to the ends of the wire sections which form the shoulder of the dummy at points r see FIGURE 7.

The wire panel has now been transformed from a flat panel to one half of the desired dummy complete with armhole, shoulders and neck form.

The half dummy is now degreased and thoroughly cleaned. It is then heated to approximately 600 degrees Fahrenheit, and dipped into plastic powder by a known method giving a total covering of plastic to the whole form.

Clasps and eyes or domed fasteners are now fixed to the longitudinal edges of the two panels of the dummy so that they may be detachably connected to form a dummy which in use may be clamped around the figure of the subject to be modelled.

At this stage the dummy is somewhat like a hollow tube, with a partly closed top resting at the top end of the tube, on the shoulders of the subject.

Manipulation now takes place to cause the longitudinal wires to follow the contour of the figure of the subject and by compressing or extending the corrugations in the lateral wires the dummy can be made to follow exactly the contour of the figure of the subject's body from the neck to waist. The neck line and the arm holes are also extensible and are manipulated to the desired size.

The two panel sections of the dummy are now separated and lifted off the figure of the subject and being of a semi-rigid nature they may be moved and handled with reasonable freedom without fear of the dummy losing shape. The two panels are then combined again to form the desired finished dummy which is advantageously mounted on a vertically extending pedestal having arms thereon for supporting different portions of the dummy at different portions of its length.

When the dummy is placed on the stand, the front and back, which are clipped together with dome fasteners, may be held apart by springs, fitted inside the dummy, the effect of which is to prevent movement of a hinging nature, where the dome fasteners attach the two halves together.

In FIGURE 8, the centre pole z of the stand has a preformed shape fitted around it which will subsequently keep the hips in a rigid position. This shape is made by a collar of wood provided with two slots in the position shown in FIGURE 8 and four holes drilled in position in these slots. The wire members w are bent into shape as shown and also at right angles at points x forming short legs which fit into the hole previously drilled and allowing the wire to be recessed into the slots cut in the collar.

The positioning of the collar and wire shapes provide a hip-ring, and will effectively keep the dummy in the desired shape.

Having now described my invention what I claim is:

1. A method for constructing panels to form a dummy, the steps for constructing each panel comprising placing a plurality of longitudinal and lateral flexible wires in overlapping relationship such that the wires are spaced from each other and intersect at substantially right angles to form a substantially rectangular panel, cutting the central longitudinal wire so that it extends slightly above the central portion of the rectangular panel, rigidly connecting the wires at their points of intersection, said longitudinal wires having extensions that extend beyond the top lateral wire, cutting the lateral wires above the cut central longitudinal wire, corrugating the lateral wires to draw the longitudinal wires closer together, bending the rectangular panel into a U-shape, rigidly connecting the cut lateral wires and the central longitudinal wire with a preformed wire section to form an arm hole, rigidly interconnecting the inner longitudinal extensions with one another to form a shoulder portion, rigidly connecting the outer longitudinal extensions with another preformed wire section to form part of the neck portion, and disposing connecting means along the outer longitudinal wires depending from the neck portion to connect with similar connecting means of a similarly formed panel to form a dummy to be fitted on a person.

2. A method according to claim 1 in which some of the top lateral wires are inclined slightly toward the center of the rectangular panel.

3. A method according to claim 1 in which additional preformed wire sections are rigidly connected at spaced intervals between the wire sections forming the neck and arm hole as well as being rigidly connected to the longitudinal extensions forming the shoulder portion.

4. A method according to claim 1 comprising the further step of thoroughly cleaning said panel, and then applying a coating of plastic material over the wires to render the panel smooth.

5. A method according to claim 1 in which said wires where connected are rigidly connected by welding.

6. A method according to claim 1 in which said flexible wires are coated with plastic material prior to forming said panel.

References Cited in the file of this patent

UNITED STATES PATENTS

| 566,259 | Welling | Aug. 18, 1896 |
| 974,507 | McNabb | Nov. 1, 1910 |
| 1,280,429 | Engle | Oct. 1, 1918 |
| 2,367,891 | Sander | Jan. 23, 1945 |

FOREIGN PATENTS

| 1,167,786 | France | Aug. 18, 1958 |
| 1,183,406 | France | Jan. 26, 1959 |
| 635,124 | Germany | Sept. 10, 1936 |
| 436,933 | Great Britain | Jan. 16, 1934 |